(12) United States Patent
Gazier et al.

(10) Patent No.: US 9,100,133 B2
(45) Date of Patent: Aug. 4, 2015

(54) METHODS AND SYSTEMS FOR CARRYING SYNCHRONIZATION OVER ETHERNET AND OPTICAL TRANSPORT NETWORK

(75) Inventors: Michaël Gazier, Ottawa (CA); Ian H. Duncan, Ottawa (CA); Morteza Ghodrat, Camarillo, CA (US)

(73) Assignee: Ciena Corporation, Hanover, MD (US)

( * ) Notice: Subject to any disclaimer, the term of this patent is extended or adjusted under 35 U.S.C. 154(b) by 357 days.

(21) Appl. No.: 12/894,936

(22) Filed: Sep. 30, 2010

(65) Prior Publication Data

US 2011/0019681 A1    Jan. 27, 2011

Related U.S. Application Data

(63) Continuation-in-part of application No. 11/645,483, filed on Dec. 26, 2006, now Pat. No. 8,059,685.

(51) Int. Cl.
*H04J 3/06* (2006.01)
*H04J 3/16* (2006.01)
*H04L 25/49* (2006.01)

(52) U.S. Cl.
CPC ............. *H04J 3/0638* (2013.01); *H04J 3/1658* (2013.01); *H04L 25/4908* (2013.01); *H04J 3/0647* (2013.01); *H04J 3/0658* (2013.01); *H04J 2203/0085* (2013.01)

(58) Field of Classification Search
None
See application file for complete search history.

(56) References Cited

U.S. PATENT DOCUMENTS

| | | | | |
|---|---|---|---|---|
| 6,158,014 A * | 12/2000 | Henson | | 713/501 |
| 7,023,883 B1 * | 4/2006 | Lui et al. | | 370/503 |
| 7,251,256 B1 * | 7/2007 | Barry et al. | | 370/503 |
| 7,263,338 B2 * | 8/2007 | Denk et al. | | 455/125 |
| 7,382,845 B1 * | 6/2008 | Shenoi | | 375/361 |
| 7,760,724 B2 * | 7/2010 | Steindl | | 370/389 |
| 2003/0217215 A1 * | 11/2003 | Taborek et al. | | 710/305 |
| 2005/0036524 A1 * | 2/2005 | Wojtowicz | | 370/537 |
| 2005/0088991 A1 * | 4/2005 | Kil | | 370/329 |
| 2007/0058680 A1 * | 3/2007 | Choi et al. | | 370/480 |
| 2008/0069570 A1 * | 3/2008 | Dallesasse | | 398/139 |
| 2009/0024756 A1 * | 1/2009 | Spalla et al. | | 709/231 |
| 2010/0177785 A1 * | 7/2010 | Kisaka et al. | | 370/465 |
| 2011/0126074 A1 * | 5/2011 | Calderon et al. | | 714/752 |

* cited by examiner

*Primary Examiner* — Dang Ton
*Assistant Examiner* — Ronald H Davis
(74) *Attorney, Agent, or Firm* — Clements Bernard PLLC; Christopher L. Bernard; Lawrence A. Baratta, Jr.

(57) ABSTRACT

The present disclosure relates to carrying synchronization through Ethernet, Optical Transport Network (OTN), and other asynchronous protocols. In one exemplary embodiment, timing markers or symbols are used in packets to enable a downstream device to recover timing based upon a time differential between markers or symbols. Advantageously, enabling Ethernet, OTN, etc. to carry synchronous information will de-risk switching from SONET/SDH to Ethernet and/or OTN for service providers. The present disclosure also includes frame decomposition scheme of the Ethernet stream. Ethernet packets are broken into fixed bandwidth and excess bandwidth. The fixed bandwidth is subdivided into fixed (negotiated) flits, with each flit corresponding to a specific user or combination of users like a private tunnel. This offers service providers a method to provide deterministic and more secure bandwidth over Ethernet to multiple clients.

17 Claims, 6 Drawing Sheets

METHODS AND SYSTEMS FOR CARRYING SYNCHRONIZATION OVER ETHERNET AND OPTICAL TRANSPORT NETWORK

CROSS-REFERENCE TO RELATED APPLICATION(S)

This application is a continuation-in-part of U.S. patent application Ser. No. 11/645,483 filed Dec. 26, 2006 now U.S. Pat. No. 8,059,685, and entitled "METHODS AND SYSTEMS FOR CARRYING SYNCHRONIZATION OVER ETHERNET AND OPTICAL TRANSPORT NETWORK," the contents of which are incorporated in full by reference herein.

FIELD OF THE INVENTION

The present invention relates generally to timing distribution in networks. More specifically, the present invention provides timing distribution over Ethernet and Optical Transport Network (OTN) through the use of timing markers in the Ethernet frame or in the OTN header which provide a timing capability, and further a frame decomposition of the Ethernet packet.

BACKGROUND OF THE INVENTION

Networks need timing signals to operate, namely a common clock to reference when transmitting sampled data. For example, voice and video transmission and recovery require a common clock. Traditionally, the common clock in telecom networks is a stratum level clock, such as a building integrated timing source (BITS) or the like. Clock distribution, such as with a stratum clock, is the foundation of all telecom networks with stratum levels referring to the quality of the clock. The ANSI Synchronization Interface Standard T1.101 defines profiles for clock accuracy at each stratum level, as does ITU standard G.810, and Telecordia/Bellcore standards GR-253 and GR-1244. These specifications ensure reliability and levels of accuracy of clocks in telecom networks. For example, a stratum 1 clock can be distributed to nodes equipped with a stratum 2 clock which in turn distribute the clock to nodes with a stratum 3 clock, etc.

Referring to FIG. 1, current timing distribution in an enterprise private network or service provider network 10 flows from a clock source 13 to multiple interconnected nodes, such as switch elements 11 and edge elements 12. Switch elements 11 and edge elements 12 each can include routers, switches, multi-service provisioning platforms (MSPPs), SONET/SDH network elements, and the like. A service requestor 14 can also include the same type of elements as the switch and edge elements 11,12. The clock source 13, such as a stratum clock or the like, can be located outside or within the network 10. The clock source 13 is configured to provide a clock reference signal to elements 11,12,14, which in turn carry the clock reference signal as part of the transmission link, such as within the SONET/SDH frame. In the exemplary network 10 of FIG. 1, the clock source 13 distributes the clock reference signal to the various elements 11,12,14. Further, the network 10 can distribute the clock reference signal outside the network 10 to other elements 14 through the edge elements 12.

Ethernet is becoming the common transport technology of choice in telecom networks; however it is unable to carry a true clock, such as a stratum clock, since Ethernet is asynchronous. Service providers would like to evolve their network to a unified Ethernet network, without T1/E1's, SONET/SDH, etc. This evolution includes replacing T1/E1 backhauling and cross-connecting, such as in the example application of digital loop carrier (DLC) backhaul over Ethernet, from the current DLC backhaul over T1, or such as cell tower backhaul, or such as enterprise access. Disadvantageously, removing SONET/SDH and T1s/E1s from the network eliminates the current mode of timing distribution using stratum clocks with T1/E1 reference signals.

Currently, Ethernet can support soft clock distribution through an adaptive clock over pseudowire emulation edge to edge (PWE3). However, not all service providers trust this adaptive clock (especially over Ethernet) since these clocks do not have the quality or reliability of direct clocks. For example, one conventional means of adaptive clock recovery employs adapting a local clock that is based on the level of the receiver's jitter buffer. Disadvantageously, this method requires a long period before it can lock onto a source clock and is susceptible to buffer overflow and underflow conditions.

Additionally, Optical Transport Network (OTN) multiplexing is an alternative to SONET/SDH multiplexing, and its simplified justification scheme provides a number of advantages when multiplexing 2.5 Gbps signals and above. OTN multiplexing does not, however, address lower-rate signals (such as Gigabit Ethernet (GbE), T1, T3, etc.), which would require multiplexing into SONET/SDH or other frame formats before being handled by an OTN multiplexer. The simplified OTN frame format, multiplexing scheme, and justification methodology provide for a more straightforward and scalable hardware design than SONET/SDH methodologies.

For service providers wishing to provide wavelength services or Ethernet services, OTN multiplexing provides a simpler, more straightforward, and ultimately more cost-effective, transport mechanism than SONET/SDH. However, OTN multiplexing is limited by the ITU-T specifically excluding network synchronization between network elements (NEs) from OTN specifications.

Specifically, OTN does not provide for synchronization of network elements. In ITU-T Recommendation G.8251, "The Control of Jitter and Wander within the Optical Transport Network (OTN)", it states that the OTN physical layer is not required to transport network synchronization. More precisely, neither the ODUk nor any layers below it are required to transport synchronization. Further, it states that OTUk interfaces are not synchronization interfaces. G.8251 states that the transportation synchronization over SDH is adequate for OTN. In the ITU OTN Tutorial (available at www.itu.int/ITU-T/studygroups/com15/otn/OTNtutorial.pdf), Section 13 states that an OTN NE does not require synchronization interfaces, complex clocks with holdover mode or SSM processing.

OTN does not have mechanisms in place to carry timing without carrying embedded SONET/SDH signals which have an embedded clock. Since Ethernet and OTN are asynchronous media and not configured to carrying synchronization, common clocks are lost. This presents challenges for service providers in evolving their network to a unified Ethernet network without T1's, SONET, etc.

BRIEF SUMMARY OF THE INVENTION

In various exemplary embodiments, the present invention relates to carrying synchronization through Ethernet, Optical Transport Network (OTN), and other asynchronous protocols. In one exemplary embodiment, timing markers or symbols are used in packets to enable a downstream device to recover timing based upon a time differential between markers or symbols. The present invention may reserve special Ethernet timing markers to mark timing within Ethernet and OTN, and secondarily creates frames within the Ethernet stream through the timing marker packets. The result is standard Ethernet with timing capability that can be transported over standard Ethernet links and/or OTN links. This timing capability can be utilized to carry synchronization (i.e. a hard clock) over asynchronous Ethernet and OTN streams. Although the present invention is described herein with respect to Ethernet and OTN, those of ordinary skill in the art will recognize the systems and methods described herein may be utilized with any protocol.

In an exemplary embodiment, a method for carrying synchronization includes inserting a timing marker via a special symbol in a line encoding scheme associated with a signal; transmitting the signal with the timing marker to a downstream node; and establishing a timing reference based upon the timing marker. Optionally, the signal includes Ethernet or Optical Transport Network and the line encoding scheme includes any of 8B/10B, 64B/66B, 64B/65B, and 512B/513B. The timing marker may be a first timing marker, and wherein the method may further include inserting a second timing marker via the special symbol in the line encoding scheme, wherein a timing difference between the first timing marker and the second timing marker defines the timing reference; wherein the establishing a timing reference is further based on the second timing marker. The method may be performed by any of an Ethernet switch, a multi-service switch, a computer, a router, and an Optical Transport Network switch. Optionally, the signal includes Ethernet, and wherein the timing marker is inserted as the highest priority. The signal may include Ethernet, and wherein the timing marker is inserted as a special 8B/10B symbol. Alternatively, the signal includes Optical Transport Network, and wherein the timing marker is inserted as a special 64B/66B symbol.

In another exemplary embodiment, a network element includes a plurality of ports; circuitry communicatively coupled to one or more of the plurality of ports, wherein the circuitry is configured to insert timing markers based upon a timing reference via a special symbol in a line encoding scheme associated with a signal. Optionally, the signal includes Ethernet or Optical Transport Network and the line encoding scheme includes any of 8B/10B, 64B/66B, 64B/65B, and 512B/513B. The timing markers may be each inserted at a defined interval based on the timing reference. The method may be performed by any of an Ethernet switch, a multi-service switch, a computer, a router, and an Optical Transport Network switch. Optionally, the signal includes Ethernet, and wherein the timing marker is inserted as the highest priority. The signal may include Ethernet, and wherein the timing marker is inserted as a special 8B/10B symbol. Alternatively, the signal includes Optical Transport Network, and wherein the timing marker is inserted as a special 64B/66B symbol.

In yet another exemplary embodiment, a network includes a plurality of network elements interconnected therebetween and configured to interface data signals therebetween, wherein the data signals comprise a line encoding scheme, and wherein one or more of the plurality of network elements are configured to transmit synchronization over the data signals utilizing special symbols in the line encoding scheme. Optionally, the signal includes Ethernet or Optical Transport Network and the line encoding scheme includes any of 8B/10B, 64B/66B, 64B/65B, and 512B/513B. Alternatively, the signal includes Optical Transport Network, and wherein the timing marker is inserted as a special 64B/66B symbol.

BRIEF DESCRIPTION OF THE DRAWINGS

The present invention is illustrated and described herein with reference to the various drawings, in which like reference numbers denote like method steps and/or system components, respectively, and in which.

DETAILED DESCRIPTION OF THE INVENTION

In various exemplary embodiments, the present invention relates to carrying synchronization through Ethernet, Optical Transport Network (OTN), and other asynchronous protocols. In one exemplary embodiment, timing markers or symbols are used in packets to enable a downstream device to recover timing based upon a time differential between markers or symbols. The present invention may reserve special Ethernet timing markers to mark timing within Ethernet and OTN, and secondarily creates frames within the Ethernet stream through the timing marker packets. The result is standard Ethernet with timing capability that can be transported over standard Ethernet links and/or OTN links. This timing capability can be utilized to carry synchronization (i.e. a hard clock) over asynchronous Ethernet and OTN streams. Advantageously, enabling Ethernet and OTN to carry solid synchronous information will de-risk switching from SONET/SDH to Ethernet and/or OTN for service providers. Although the present invention is described herein with respect to Ethernet and OTN, those of ordinary skill in the art will recognize the systems and methods described herein may be utilized with any protocol.

A secondary result of the present invention includes frame decomposition of the Ethernet stream. Ethernet packets are broken into fixed Ethernet bandwidth and excess Ethernet bandwidth. The fixed bandwidth is subdivided into fixed (negotiated) flits, with each flit corresponding to an end user or a combination of users like a private tunnel and potentially offering increased security by user isolation. By having the Ethernet data pre-divided into flits, circuit design including buffers is simplified. This decomposes the problem set to fixed lower bandwidth circuits that can be multiplexed at higher rates. Further, this offers service providers a method to provide deterministic bandwidth over Ethernet to multiple clients. In one embodiment, timing markers of the present invention are utilized to subdivide the Ethernet stream. Additionally, the stream can be subdivided based of a specific number of bytes but aligned to the closest packet edge (forward or back), or with special characters or sequences.

Figure 1:
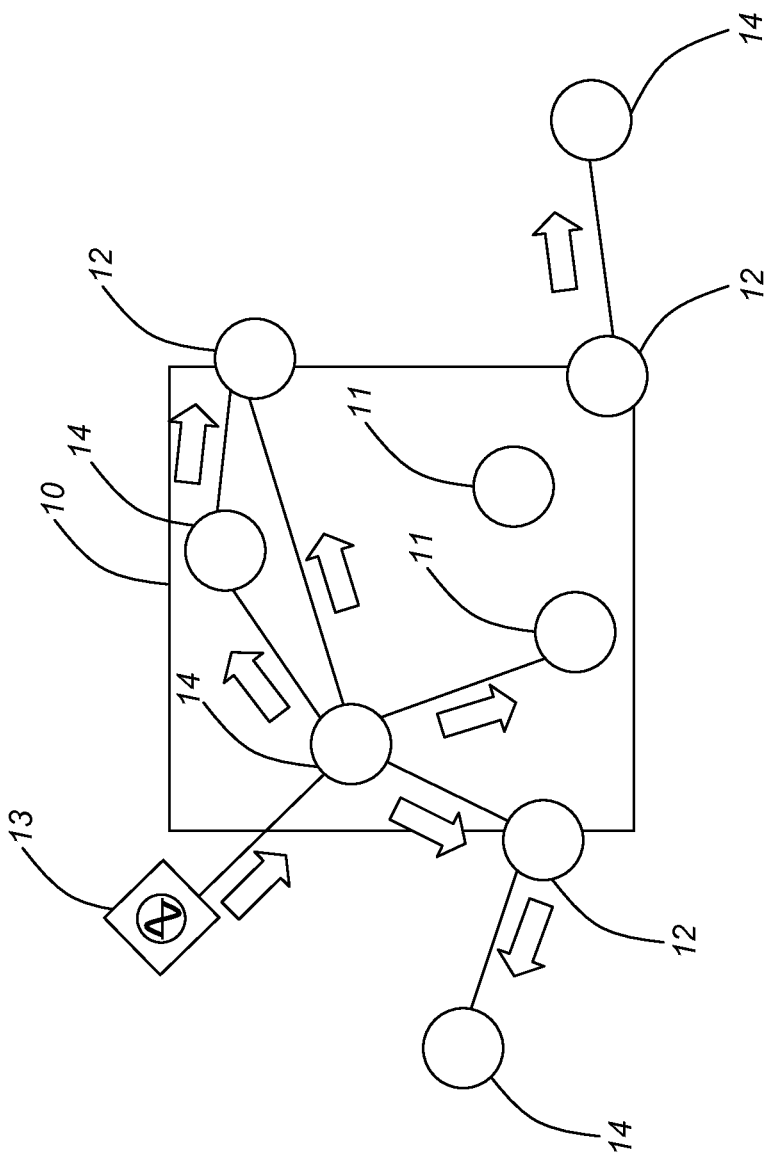
FIG. 1 illustrates current timing distribution in an enterprise private network or service provider network which includes multiple interconnected nodes, such as switch elements and edge elements.
Figure 2:
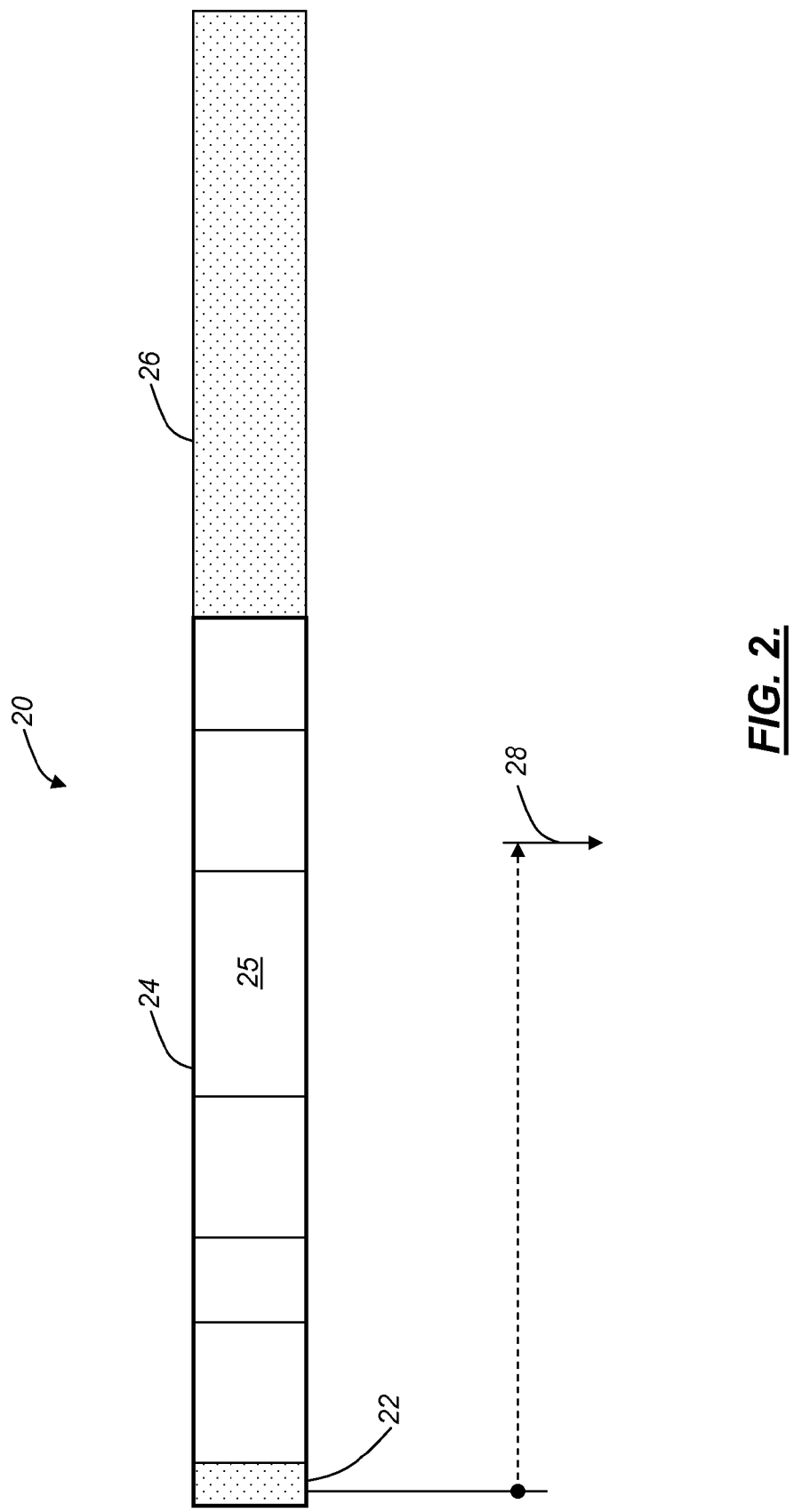
FIG. 2 illustrates an Ethernet packet with timing markers and frame decomposition, according to an exemplary embodiment of the present invention.

Referring to FIG. 2, an Ethernet packet 20 includes a timing marker 22 pointing to the next occurrence of a timing marker 28, according to an exemplary embodiment of the present invention. The Ethernet packet 20 can be Gigabit Ethernet (GbE), 10 Gigabit Ethernet (10 GbE), 100 Gigabit Ethernet (100 GbE), or the like. The timing marker 22 can be a pointer in the Ethernet packet 20. These markers 22,28 can be inserted every number of bytes, and typically 8 kHz (125 µs) which is equivalent to a typical stratum or SONET/SDH clock, but the frequency can be adjusted as required. The frequency between timing markets 22,28 corresponds to the timing reference signal carried in the Ethernet packet 20. Traditionally, 8 kHz is the basic unit of change in any timing network and is used usually for voice sampling, for example, 125 is the frame size of SONET/SDH frames. Additionally, timing markers 22,28 such as superframes can also be carried, and typically a superframe marker is 3 ms.

Ethernet switches and the like are configured to receive, process, and forward the Ethernet packets 20. The present invention includes new functionality on the Ethernet switches and the like to process the timing markers 22,28 to recover a clock. For example, the switches look at the markers 22,28 and count back from the current Ethernet packet by that many bytes. The markers 22,28 point to where actual events occur. Once that point in time is found, the switches correct their clocks to match that clock, usually it is corrected slowly. This is similar to a classical SONET/SDH stratum clock on a classical system such as an MSPP or optical cross-connect (OXC). However, the present invention utilizes markers 22,28 in the Ethernet packet 20, which is different from SONET because SONET the clock is determined by locking to the SONET frame which is 125 µs. Effectively, a timing reference signal is established responsive to the frequency between timing markers 22,28. This timing reference signal can be used to provide a synchronization reference as is typically done with SONET/SDH.

Since the switches are Ethernet switches, they expect complete Ethernet packets 20. Thus, either the packets 20 are appropriately resized before crossing the link, or more usually the actual timing marker 22 is placed at a closest possible location. The timing marker 22 will thus be located at a variable but close location to the ideal number of bytes and is typically corrected each frame with respect to the ideal position.

A superframe is a timing marker that covers several Ethernet packets. Superframes are used for larger numbers than the typical 125 is in frames. For example, superframes are used in wireless cell networks to synchronize multiple cell towers. A superframe can be used to synchronize multiple pieces of equipment that receive data in a way that cannot guarantee all receivers know the same packet. Superframes can be used with the timing markers 22,28 pointing to occurrences in future packets to synchronize, for example, across milliseconds.

Additionally, the present invention allows for an optional decomposition of the Ethernet packet 20 into fixed Ethernet bandwidth 24 and excess Ethernet bandwidth 26. The fixed bandwidth 24 is subdivided into fixed (negotiated) flits 25. Each flit 25 corresponds to an end user. The end user can be a single user or an enterprise with multiple users, for example, a user can be a person, household, business, or the like corresponding to one tunnel. The flit 25 can be viewed as a private tunnel. The flit 25 comes of use when dealing with high frequency Ethernet, for example 100 GbE. These rates are high enough to cause challenges in designing circuitry dealing with this bandwidth. By having the Ethernet data pre-divided into flits 25, circuit design including buffers is simplified. This decomposes the problem set to fixed lower bandwidth circuits that can be multiplexed at higher rates.

Furthermore it is possible that excess bandwidth 26 remains in the Ethernet packet 20. This can be dynamically allocated to individual tunnels on an as-needed basis, possibly even dynamically. One can consider a way to handle this excess bandwidth and entire structure in a similar way to the passive optical networking (PON) dynamic bandwidth allocation method (DBA). Note that this is simply a sample method, and in fact does not have to be related to PON, and that many such algorithms can be created for the given purpose by one skilled in the art.

Advantageously, the timing markers 22,28 of the present invention can be used to create the frame decomposition of the Ethernet packet 20 into the fixed Ethernet bandwidth 24, excess Ethernet bandwidth 26, and the fixed flits 25. Specifically, the timing markers 22,28 can be inserted both for the purposes of carrying a clock in the Ethernet packet 20 and for marking the flits 25 and bandwidths 24,26. Here, each marker 22,28 can be used to signify a frame break for each flit 25 and bandwidth 24,26. Such as a pointer in the same place the timing marker 22,28 is, or part of the same set of bytes or in the timing market 22,28. The pointer to the flits 25 and bandwidths 24,26 may be forward or backward referential (where it has occurred or where it will occur). Additionally, other methods could be utilized in decomposing the packet 20 such as a provisioned depth in frame (e.g., every # of bytes or # flits, but aligned to the closest packet edge, forward or back), or marked with a specific character/sequence, like an HDLC start of frame.

Figure 3:
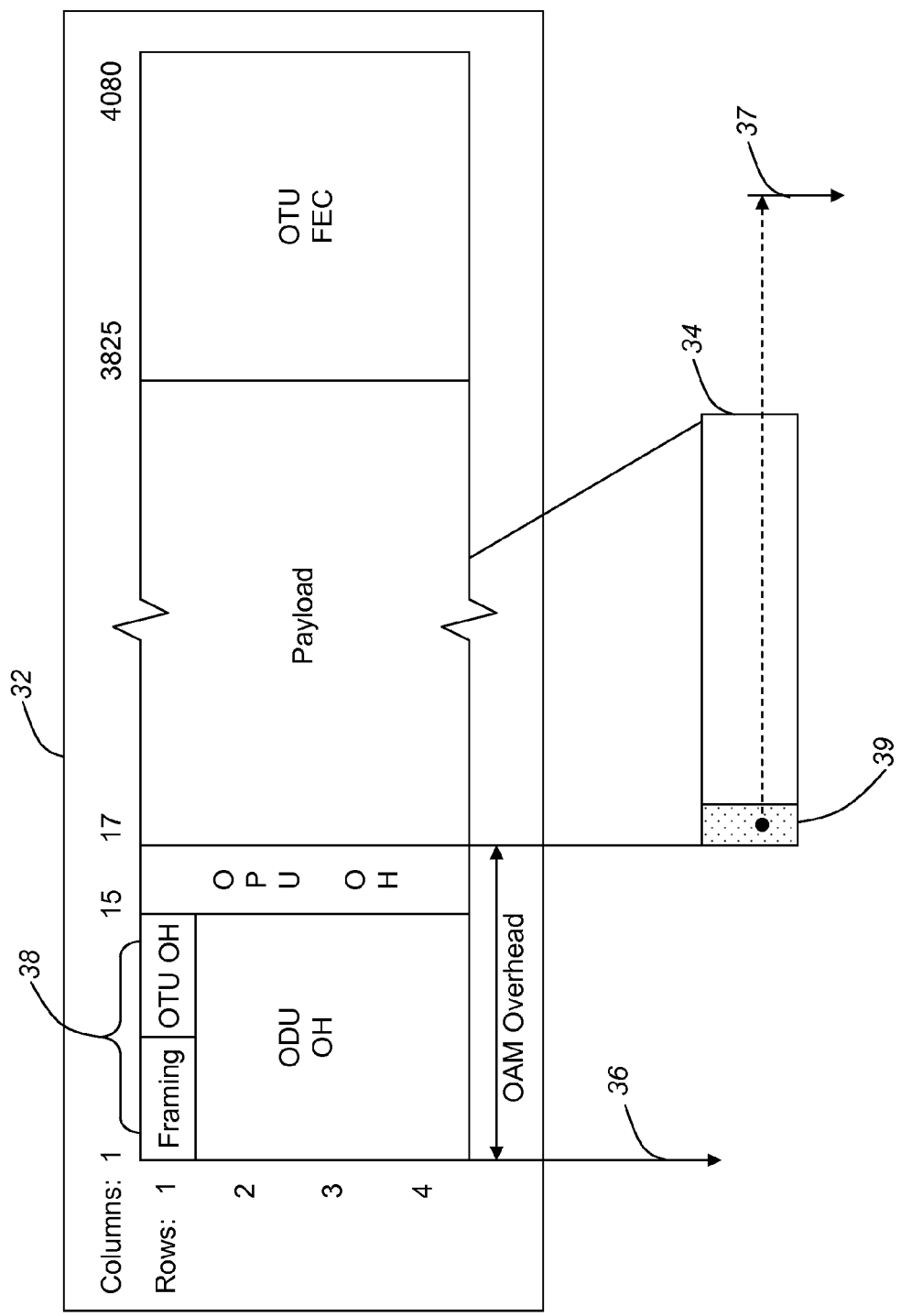
FIG. 3 illustrates carrying a clock in Ethernet packets carried within an OTN frame or carrying a clock within the header of the OTN frame, according to another exemplary embodiment of the present invention.

Referring to FIG. 3, another exemplary embodiment of the present invention includes carrying a clock in Ethernet packets 34 carried within an OTN frame 32 or carrying a clock within the header of the OTN frame 32. Ethernet, such as FE, GE, or 10 GbE or the like, can be carried within optical transmission units of level i (OTUi), where i is currently typically 1, 2, or 3. In one embodiment, the Ethernet packet 34 carries timing markers similar as described in FIG. 2. The packet 34 includes a timing marker 39 in the frame similar to the timing marker 22 in FIG. 2 which points to another timing marker 37 which can be 8 kHz or any other timing reference. Advantageously, this embodiment decouples timing from the OTN network as specified in the OTN specifications and it is fully standard with a single method to carry timing across a network which can include mixed Ethernet and OTN.

In another embodiment, a timing marker 38 can be included in the header of the OTN frame 32 which points to another timing marker 36 which can be 8 kHz or any other timing reference. Advantageously, this embodiment does not depend on carrying embedded SONET/SDH within the OTN frame 32 as required in OTN to carry synchronization and carrying timing in the OTN header prevents jitter or any other Ethernet/payload issues which can affect the timing.

Here, the marker 36 is included in either reused bytes or unused bytes in the OTN header. The pointer is adjusted on-the-fly to point to the closest spot depending on the actual transmission of the OTN frame 32. In the example where the OTN frame 32 was somehow transmitted synchronous to 8 kHz, the marker 36 would be constant in subsequent OTN frames 32. Normally, the marker 36 would point to a constant 8 kHz (or other user-selectable frequency) spot, but asynchronously to the OTN frame 32, i.e., namely a marker 32 that is not constant in subsequent OTN frames 32.

Further, the frame decomposition of bandwidth in the Ethernet packet disclosed in FIG. 2 can be implemented in the Ethernet packet 34. Also, carrying timing within the Ethernet or within the OTN header avoids having to depend on adaptive timing and the related complexities.

Finally, in order to keep the Ethernet framing standard, the timing markers 22,28,37,39 can be carried inside a standard Ethernet packet. However, these could also be carried out-of-band marked with a special 8b/10b symbol, but this would lose the standards-based view of the timing marker, even though it would be more efficient. Maintaining the Ethernet standard has many advantages in general circuit design, including more complex cross-connect cases. 8b/10b is a line coding method that generally maps 8-bit symbols to 10-bit symbols. That is, 8 bits of data are transmitted as a 10-bit entity called a symbol, or character.

In another exemplary embodiment, the timing markers may be used only with the OTN frame 32. Here, the may be a first timing marker at the OTN frame 32 start and a second timing maker at a variable spot in the OTN frame 32 since OTN is asynchronous. That is, the difference between the first timing marker and the second timing marker is constant, but the position may differ due to the asynchronous nature of OTN. Similar to the standard Ethernet packet, the OTN frame 32 may carry these timing markers via out-of-band markers in a line encoding scheme, such as 64B/66B, 64B/65B, etc. In an exemplary embodiment, the first marker is an "escape" and the second is an offset pointer (i.e., a number), for example "100" would mean the timing marker is in 100 bits. Alternatively, the timing markers may be inserted within unused bits in the OTN overhead.

The timing markers described herein may be utilized in the line encoding scheme of any protocol. As discussed herein, various exemplary protocols include 8B/10B, 64B/66B, 64B/65B, and the like. The present invention contemplates using special symbols or markers in any line encoding protocol that is currently used or developed in the future. Other line encoding schemes contemplated herein include Conditioned Diphase, 4B/3T, 4B/5B, 2B/1Q, Alternate Mark Inversion, Modified AMI code, Coded mark inversion, MLT-3 encoding, Hybrid ternary code, 6B/8B, Eight-to-fourteen modulation, Delay/Miller encoding, TC-PAM, 512B/513B, XB/YB where X and Y are any integers, and the like.

According to an exemplary embodiment of the present invention, new functionality is added on elements, such as Ethernet switches, multi-service switches, routers, computers, OTN switches, and the like, for extracting the timing markers embedded within Ethernet packets and/or within OTN frames. As described herein, the timing markers comply with the Ethernet standards and OTN standards, and these new clock-capable elements can be deployed with non-clock capable elements which are not configured to extract timing markers, with clock-capable elements of the present invention, or in combinations thereof. The present invention can be utilized over any media, such as optical, wireless, cable, satellite, and the like, where Ethernet and/or OTN is transmitted.

Figure 4C:
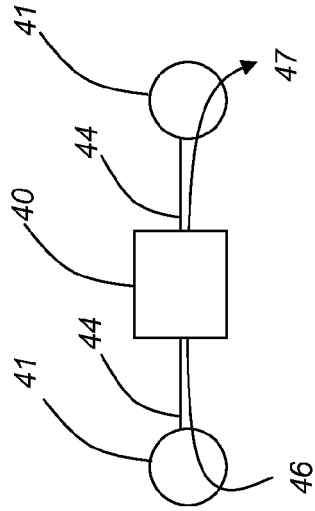
FIGS. 4*a*-4*d* illustrate network clock distribution through Ethernet switches configured to extract a clock from an Ethernet signal and clock regeneration nodes configured to regenerate the clock in the Ethernet signal.
Figure 4D:
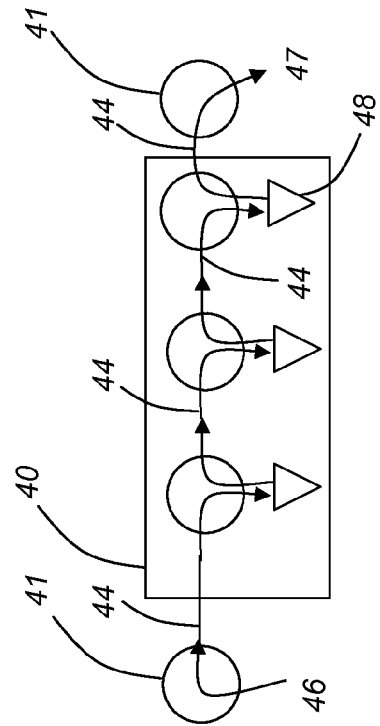
Figure 4A:
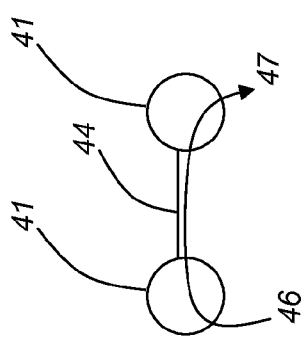

Referring to FIGS. 4a-4d, network clock distribution includes Ethernet switches 41 configured to extract a clock from an Ethernet signal and clock regeneration nodes 48 configured to regenerate the clock in the Ethernet signal, according to an exemplary embodiment of the present invention. As described herein, the switches 41 utilize embedded timing markers within the Ethernet to recover a clock. FIG. 4a illustrates two switches 41 connected by an inter-node link 44 such as an Ethernet, OTN link, or the like. A clock input 46 from a source is received at the first switch 41 and transported over the inter-node link 44 to a clock output 47 at the second switch 41. FIG. 4a is a one hop, point-to-point network, but could be expanded with more switches 41 all clock-capable according to the present invention. An example of this is depicted in FIG. 4d.

Figure 4B:
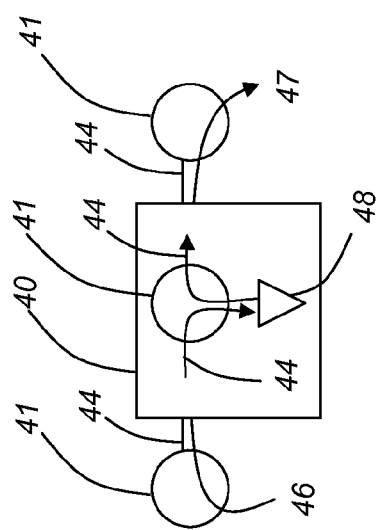

FIG. 4b illustrates two switches 41 connected together through a network 40 such as an enterprise private network or a service provider network. The network 40 can include other switches (not shown) which are not configured to extract the clock from the Ethernet signal such as existing Ethernet switches and the like. In the exemplary embodiment of FIG. 4b, the network 40 includes another switch 41 in the middle of the network 40 configured with a clock regenerator 48 operable to extract the clock from the Ethernet signal and regenerate the clock similarly to what occurs at a stratum 3 clock node in a SONET network. The addition of this switch 41 with the clock regenerator 48 reduces issues with the clock in the Ethernet signal such as jitter and delay degrading the clock. Additionally, more switches 41 can be included in the network 40 as needed to increase the quality of the clock carried in the Ethernet stream.

FIG. 4c illustrates two switches 41 connected together through the network 40 with no clock regeneration in the network 40. This exemplary network depicts two Ethernet switches 41 of the present invention connected through the network 40 of Ethernet switches without clock capability. In one exemplary embodiment, FIG. 4c can include an Ethernet over OTN network with channelized OTN links that carry a dedicated Ethernet "virtual point-to-point" link across an Ethernet cloud. This would work since the link is a virtual point-to-point and thus intermediate jitter is not introduced. Additionally, the timing reference signal in the Ethernet stream should be set to the highest priority through the network 40, if the network 40 supports prioritization which existing Ethernet switches normally do support.

FIG. 4a is better than FIG. 4b which is better than FIG. 4c because in FIG. 4a the clock will be regenerated after each inter-node link 44, allowing minimal jitter between links 44. FIG. 4b is better than FIG. 4c because it regenerates the clock one or more times in the network, allowing the clock quality to be maintained higher. However, FIGS. 4a-4b require new clock-capable Ethernet switches 41 to be deployed in the network 40, whereas FIG. 4c only requires these switches 41 at the end-points.

FIG. 4d illustrates an exemplary embodiment of the present invention with all switches 41 in the network 40 configured as clock-capable Ethernet switches. Here, each switch 41 has the ability to regenerate the clock from the Ethernet stream with the clock regenerator 48 in each switch 41. Preferably, the network 40 includes all switches 41 as clock-capable according to the present invention. This ensures the clock carried within the Ethernet stream is not degraded due to jitter and delay through non-clock-capable switches. However, the present invention can also be practiced as depicted in FIGS. 4b and 4c. Advantageously, clock-capable switches 41 can be added as needed similar to the example depicted in FIG. 4b to ensure clock quality.

As described herein, the switches 41 can connect to other switches 41 and to non-clock capable switches. This allows the network 40 to provide a clock over Ethernet, OTN, SONET/SDH, T1/E1, and BITS. The present invention may use an external timing source or reference including a BITS clock, a global positioning satellite (GPS) source such as Galileo, and the like. The switches 41 include the capability to program, configure, or hard-wire which clock to use as an input, to drive the internal clock from, and to drive any outgoing links on. Advantageously, this provides similar capabilities to Ethernet and OTN networks relating to clocks which exist in SONET/SDH.

Further, the switches 41 can also include a multi-service switch, a computer, a router, an OTN switch, or the like. The present invention can provide a clock over Ethernet and/or OTN utilizing any networking device configured to operate with Ethernet and OTN. Ethernet switches are shown in FIGS. 4a-4d for illustration purposes.

Advantageously, the present invention allows synchronization to be maintained to provide the required timing reference signal to applications such as voice, video, or any other real-time stream utilizing Ethernet and/or OTN without SONET/SDH and adaptive clock recovery. The present invention will allow service providers to migrate to a unified Ethernet network without SONET/SDH. Application examples of the present invention include cell tower back-hauling over Ethernet and/or OTN since cell towers have complex and highly stringent timing requirements. Further, the synchronization methods of the present invention are also contemplated with voice over Internet Protocol (VoIP), Internet Multimedia Subsystem (IMS), and the like.

Figure 5B:
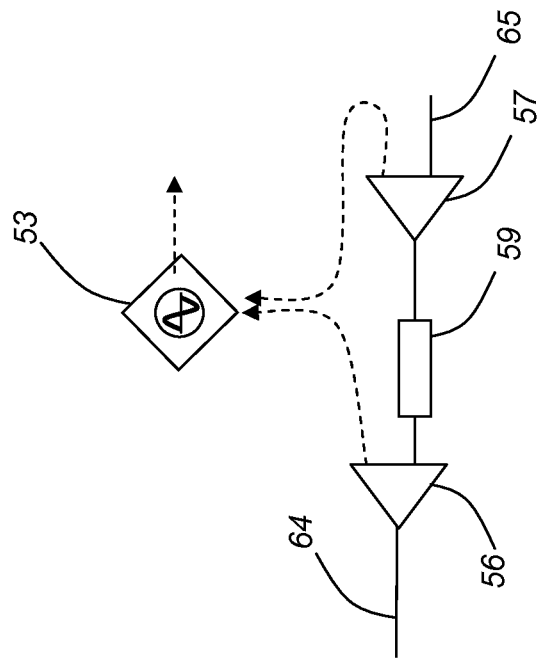
FIGS. 5*a*-5*b* illustrate the insertion and extraction of timing markers as timing packets in Ethernet, according to an exemplary embodiment of the present invention.
Figure 5A:
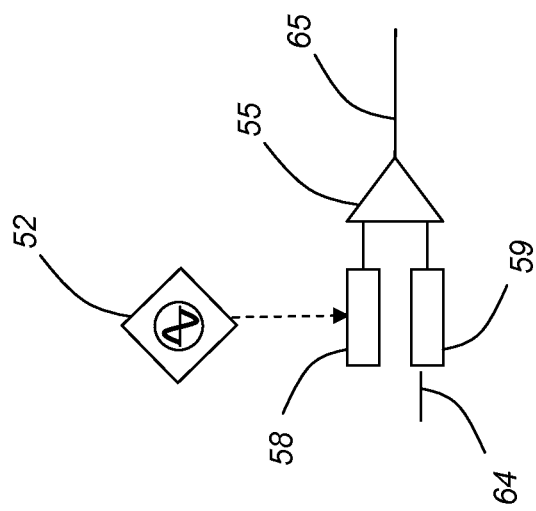

Referring to FIGS. 5a-5b, timing markers are inserted and extracted as timing packets from Ethernet, according to an exemplary embodiment of the present invention. FIG. 5a illustrates the insertion of a timing packet, and FIG. 5b illustrates the extraction of the timing packet. The insertion and extraction of timing packets is done through an Ethernet switch or the like which is configured to generate a clock through timing markers with Ethernet packets.

In FIG. 5a, a buffer/queue 59 receives packets/frames from an entrance inter-node link 64 such as Ethernet, OTN, or the like. The buffer/queue 59 sends received packets/frames to a multiplexer 55 which multiplexes them and sends them on an exit inter-node link 65 such as Ethernet, OTN, or the like. The multiplexer 55 can be configured to multiplex Ethernet packets, OTN frames, or the like. A clock source 52 such as a stratum clock or the like generates a clock signal, typically at 8 kHz (125 μs) or any other user-defined rate. A buffer/queue 58 is configured to insert the timing packet to the multiplexer 55 responsive to the clock signal. Preferably, the buffer/queue 58 is configured to insert the timing packet as the highest priority, i.e. next in line, corrupting and retransmitting the current packet if allowed, or inserting the timing packet in the middle of the current packet. By making the timing marker packet highest priority, this minimizes jitter on the recovered clock in order to converge quickly and solidly to the actual clock signal.

In FIG. 5b, a de-multiplexer 56 can receive packets/frames from the entrance inter-node link 64 such as Ethernet, OTN, or the like. Alternatively, a de-multiplexer 57 can receive packets/frames from a queue/buffer 59. The de-multiplexer 56,57 is configured to extract timing packets from the received packets/frames and send them to a clock source 53 such as stratum clock or the like. Alternatively, the de-multiplexer 56,57 can be configured to generate a clock from the extracted timing packets and to provide the clock to the clock source 53. Further, the clock source 53 includes a receiver and it may include filters, phase lock loops (PLL), digital signal processors (DSP), processors (CPU), voltage controlled oscillators (VCXO), and the like for proper clock reception, recovery, and distribution. The clock source 53 can be configured to generate a clock from the received timing packets in the Ethernet and/or OTN signals and can also be configured to provide the clock to other devices. Similar to insertion, the de-multiplexer 56,57 should be configured to extract the timing packets as the highest priority, in order to minimize jitter and delays.

Figure 6:
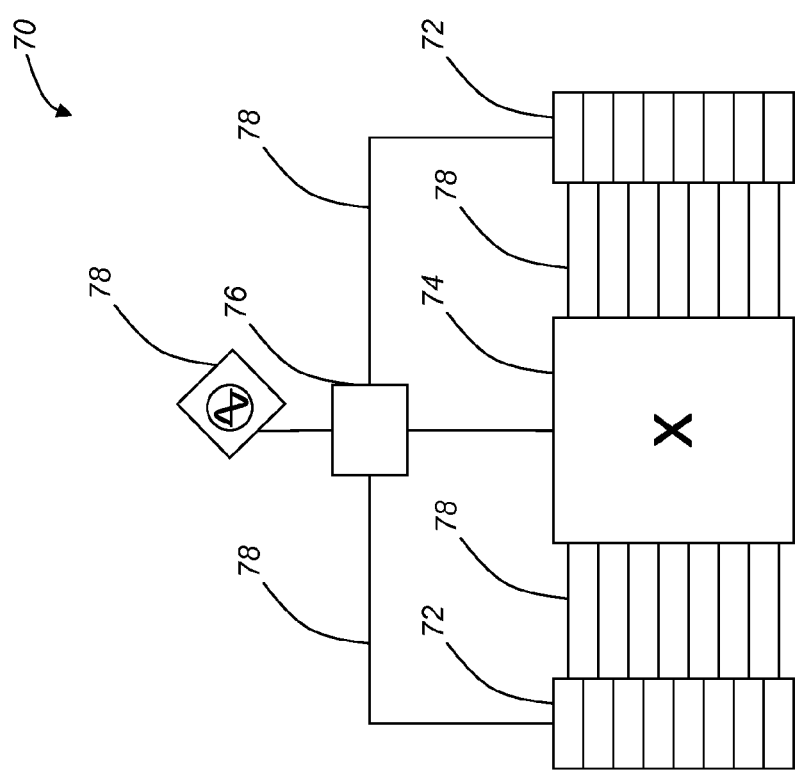
FIG. 6 illustrates a block diagram of a network element configured to use timing markers, according to an exemplary embodiment of the present invention.

Referring to FIG. 6, in an exemplary embodiment, a block diagram illustrates a network element 70 configured to use timing markers of the present invention. In general, the network element 70 includes line modules 72, a switch module 74, and common equipment 76 each communicatively coupled therebetween via an interface 78 (such as, e.g., a backplane, midplane, etc.). The line modules 72 include a plurality of ports that interconnect with line modules 72 or the like on other network elements 70, e.g. via optical links or the like. The line modules 72 provide ingress and egress for signals such as Ethernet, OTN, etc. The switch module 74 is configured to communicatively coupled signals to/from the line modules 72 and to provide switching therebetween. For example, the switch module 74 may provide Ethernet packet switching, OTN time division multiplexed switching, and the like. The common equipment 76 is generally configured to provide operations, administration, maintenance, and provisioning (OAM&P) functionality associated with the network element 70. In an exemplary embodiment, the network element 70 may be connected to a timing source 78, such as, for example, via the common equipment 76. Here, the network element 70 may be configured to insert the timing markers as described herein into a signal in any of the line modules 72.

The common equipment 76 may include one or more modules, cards, line blades, etc. with electrical circuitry configured to implement the systems and methods described herein. Specifically, the common equipment 76 may connect to the timing source 78, insert the timing markers based on the timing source 78 in signals via special symbols in a line encoding scheme, etc. It should be understood that FIG. 6 is a simplified representation of the network element 70 for illustration purposes. The present invention contemplates any number of interconnected network elements 70 forming an optical network. The topology and configuration of the optical network may vary to suit the needs of the particular application, and FIG. 6 is not intended to limit the application or scope of the subject matter in any way. Further, it should be appreciated that FIG. 6 depicts the network element 70 in an oversimplified manner, and a practical embodiment may include additional components and suitably configured processing logic to support known or conventional operating features that are not described in detail herein. Also, the configuration of the network element 70 is provided as an exemplary illustration and the present invention contemplates other configurations besides common equipment 102, line modules 104, and switch modules 106

In an exemplary embodiment, OTN is added on an existing switch or router on the line side. For example, there is a switch or router sending Ethernet with an OTN header (or part of it, e.g. light versions of OTN). This may be done for a variety of reasons including FEC, OAM&P management, interoperability with transport gear, etc. In this scenario, the symbol or bit insertion or pointer methods of the present invention may apply to the Ethernet and/or the OTN. By light versions of OTN, this includes OTN that does not have all of the multiplexing capability. For example, this may include a GbE with a semi-predefined OTN wrapper and a few flexible fields. Another example may include a 10 GbE in an OTU-2 that is fixed and not changeable from one fixed mapping and only some fields in the header are properly set.

As discussed herein, the timing packets with the Ethernet maintain the full Ethernet standard. Ethernet switches can be modified to process, extract, and generate a clock from the timing packets. Additionally, the timing packets can be sorted by media access control (MAC) identification (i.e., source and/or destination), by a new Ethertype, or by any other suitable method.

The systems and methods described herein may also apply to Multi-Protocol Label Switching (MPLS) and variants thereof (e.g., MPLS-TP Transport Profile, etc). Specifically, timing distribution may occur in these protocols using the concept of symbol or special character/message insertion.

Also, these protocols may use the symbol or special character/message insertion for other purposes in addition to timing distribution, e.g. protocol messaging and the like. This may include both in-band and out-of-band messaging.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention and are intended to be covered by the following claims.

What is claimed is:

1. A method for carrying synchronization, comprising:
inserting a first timing marker via a symbol in a line encoding scheme associated with a signal comprising Optical Transport Network (OTN) carrying an Ethernet stream, wherein both OTN and the Ethernet stream are asynchronous, wherein the first timing marker points to a second timing marker, wherein the first timing marker is configured to subdivide the Ethernet stream into fixed flits utilized for frame decomposition of the Ethernet stream for one or more clients, and wherein the fixed flits are collectively multiplexed to a higher rate in the Ethernet stream;
transmitting the signal with the first timing marker in the Ethernet stream within a payload of an OTN frame to a downstream node; and
establishing a timing reference based upon the first timing marker by extracting the first timing marker and the second timing marker from the payload.

2. The method of claim 1, wherein the line encoding scheme comprises any of 8B/10B, 64B/66B, 64B/65B, and 512B/513B.

3. The method of claim 1, further comprising:
inserting the second timing marker via the symbol in the line encoding scheme, wherein a timing difference between the first timing marker and the second timing marker defines the timing reference.

4. The method of claim 1, wherein the method is performed by any of an Ethernet switch, a multi-service switch, a computer, a router, and an Optical Transport Network switch.

5. The method of claim 1, and wherein the first timing marker is inserted with the highest priority through one of corrupting and retransmitting a current packet or inserting in a middle of a the current packet.

6. The method of claim 1, wherein the first timing marker is an 8B/10B symbol.

7. The method of claim 1, wherein the first timing marker is a 64B/66B symbol.

8. A network element, comprising:
a plurality of ports; and
circuitry communicatively coupled to one or more of the plurality of ports, wherein the circuitry is configured to insert timing markers pointing to subsequent timing markers in an Ethernet stream based upon a timing reference, wherein the timing markers are a symbol in a line encoding scheme associated with a signal comprising Optical Transport Network (OTN) carrying the Ethernet stream, wherein both OTN and the Ethernet stream are asynchronous, wherein the timing markers are configured to subdivide the Ethernet stream into fixed flits utilized for frame decomposition of the Ethernet stream for one or more clients, and wherein the fixed flits are collectively multiplexed to a higher rate in the Ethernet stream
wherein the timing markers are used by another network element configured to receive the OTN carrying the Ethernet stream to establish the timing reference based thereon.

9. The network element of claim 8, wherein the line encoding scheme comprises any of 8B/10B, 64B/66B, 64B/65B, and 512B/513B.

10. The network element of claim 8, wherein the timing markers are each inserted at a defined interval based on the timing reference.

11. The network element of claim 8, wherein the network element comprises any of an Ethernet switch, a multi-service switch, a computer, a router, and an Optical Transport Network switch.

12. The network element of claim 8, wherein the timing markers are inserted with the highest priority through one of corrupting and retransmitting a current packet or inserting in a middle of a the current packet.

13. The network element of claim 8, wherein the timing marker is an 8B/10B symbol.

14. The network element of claim 8, wherein the timing marker is a 64B/66B symbol.

15. A network, comprising:
a plurality of network elements interconnected therebetween and configured to interface data signals comprising Optical Transport Network (OTN) carrying Ethernet streams therebetween, wherein both OTN and the Ethernet streams are asynchronous, wherein the data signals comprise a line encoding scheme, wherein one or more of the plurality of network elements are configured to transmit synchronization over the data signals utilizing symbols in the line encoding scheme comprising timing markers pointing to subsequent timing markers in the Ethernet streams, wherein the timing markers are configured to subdivide the Ethernet streams into fixed flits utilized for frame decomposition of the Ethernet streams for one or more clients, and wherein the fixed flits are collectively multiplexed to a higher rate in the Ethernet streams;
wherein the timing markers are carried in OTN out-of-band.

16. The network of claim 15, wherein the line encoding scheme comprises any of 8B/10B, 64B/66B, 64B/65B, and 512B/513B.

17. The network of claim 15, wherein the timing marker is a 64B/66B symbol.

* * * * *